Patented Oct. 11, 1927.

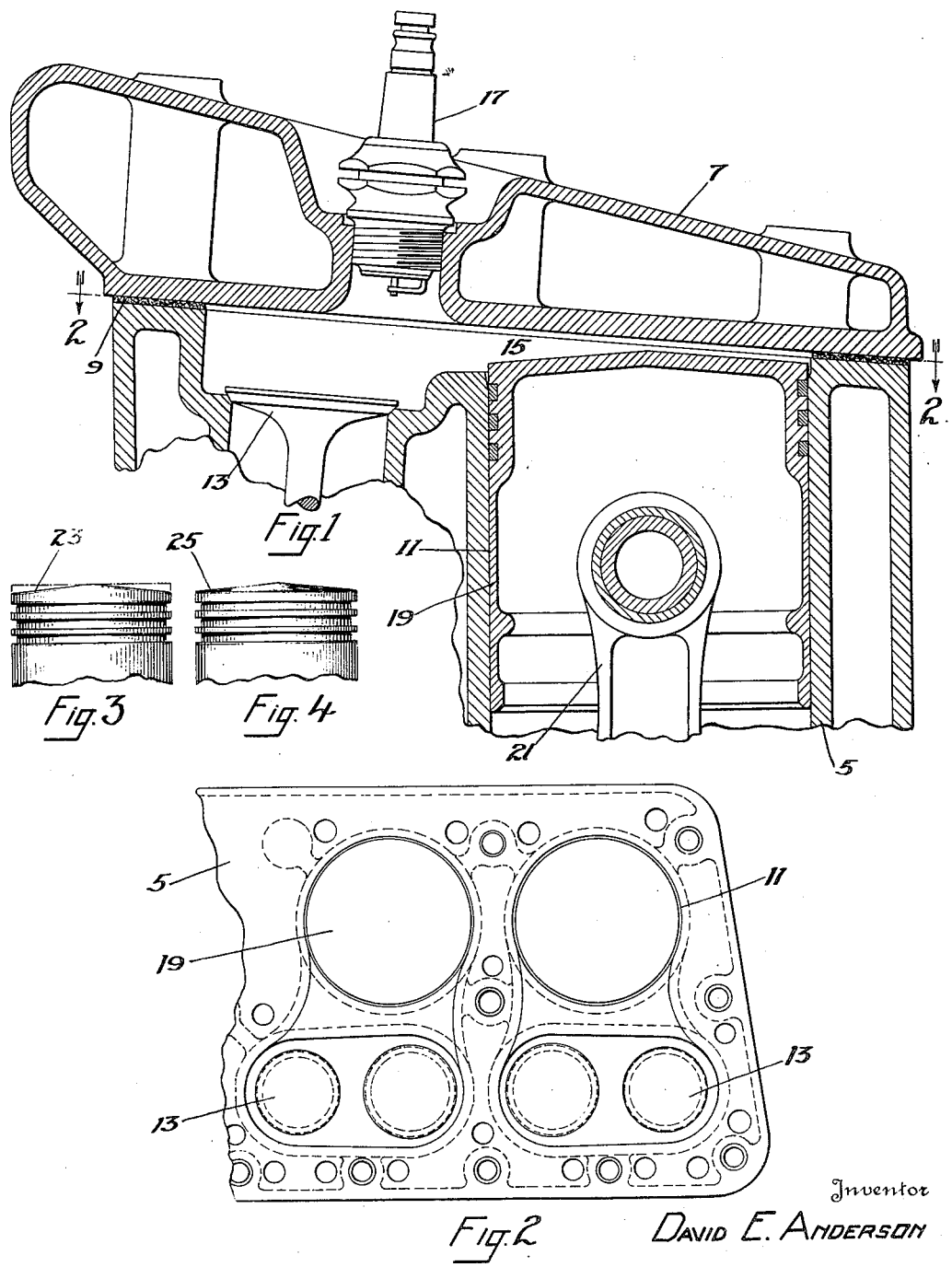

1,644,702

UNITED STATES PATENT OFFICE.

DAVID E. ANDERSON, OF DETROIT, MICHIGAN, ASSIGNOR TO GENERAL MOTORS CORPORATION, OF DETROIT, MICHIGAN, A CORPORATION OF DELAWARE.

INTERNAL-COMBUSTION ENGINE.

Application filed October 16, 1925. Serial No. 62,787.

This invention relates to an internal combustion engine and is concerned with the construction of such an engine wherein the cylinder block is made with a cylinder and adjacent inlet and exhaust valves on one side.

In such engines it is known that a better combustion of the mixture is had if provision is made for the agitation of the fuel during the compression stroke. This eliminates strata of spent gases in the combustion chamber around the spark plug.

It is an object of this invention to construct the cylinder block, the cylinder head and the piston, so as to secure this desired result by an arrangement which will involve merely a simple machining process. To that end the explosion space is confined to the cylinder block to the exclusion of the head, and with the major part of this explosion space above the valve chambers. A passage is formed in the cylinder wall communicating with said space.

For a better understanding of the invention, reference is had to the accompanying drawing in which Figure 1, shows a vertical section through the cylinder block.

Figure 2 shows a top plan view of the block with the head removed looking in the direction of the line 2—2 of Figure 1.

Figure 3 is a side elevation of one form of piston.

Figure 4 is a side elevation of a modified form.

Referring to the drawing, numeral 5 represents the cylinder block and 7 the removable head. The block and head are provided with machined surfaces and between said parts is a gasket 9. In the block are shown cylinders 11 adjacent one side thereof and along the opposite side are the valves 13 an inlet and exhaust valve for each cylinder. The top of the block is formed at an angle of slightly less than ninety degrees with the axis of the cylinder by which the head when placed upon the cylinder block produces a tapered space increasing in depth from the cylinder side of the block to the valve side of the block. The valves may have their axes normal to the face of the motor block. The valve seats are considerably depressed below the surface of the block. Restricted communication between the space above the valves and the cylinder is afforded by cutting material from the block between the cylinder and said space as shown in 15. It will thus be seen that the tapered space referred to above becomes a relatively large chamber over the valves and this chamber serves as a combustion chamber as will be explained below. The spark plug 17 is located in the head over this space.

Within the cylinder reciprocates the piston 19, being connected by a connecting rod 21 with the crank shaft (not shown). The piston has its top surface of wedge shape as shown at 23 in Figure 3 or it may be of conical shape as shown at 25 in Figure 4. The dotted lines of Figure 3 are used to show the shape of the piston before the machining operation. At the end of its stroke the piston reaches the position shown in Figure 1.

It will be seen that there is a minimum clearance between the head and the piston over substantially one-half its diameter. In the case of the wedge shaped piston, this means only one-half of the cylinder bore has any appreciable volume at the end of the stroke and that this space is tapered due to the angle of the head relative to the axis of the cylinder and also to the shape of the piston.

This tapered space communicates with the space over the valves by means of the passage cut through the cylinder wall.

In the case of the piston shaped as in Figure 4, there is a somewhat larger space above the piston at the end of its stroke, but here too by far the greater part of the explosion chamber is over the valves and the operation is substantially the same as in Figure 3.

As the piston advances in its compressent stroke the fuel is compressed in the upper end of the cylinder and in the space over the valves. At the time of the explosion, the fuel has been moved into the space over the valves, the tapered space above the portion of the piston being a relatively small part of the total combustion space. In being forced through the restricted space in the cylinder wall the fuel becomes greatly agitated and no layers of inert gas will remain around the spark plug and interfere with the explosion.

For securing these results the structure of my invention is very effective and its method of manufacture is quite simple. No modification of the machined surface of the head is required because the combustion chamber is wholly confined to the cylinder block. The boring of the valve seats and chambers in the top of the cylinder block is easily accomplished as also are the shaping of the top of the piston in either of the two forms shown.

What I claim and desire to protect by Letters Patent is:

1. A cylinder having a closure for its end and a piston reciprocating therein to a position closely adjacent said closure, valves adjacent the cylinder, the valve seats being depressed below the end closure to form thereabove a chamber constituting the greater part of the combustion chamber and located wholly within the cylinder block, the wall between the cylinder and the combustion chamber having a restricted passage which affords communication between the cylinder and the combustion chamber when the piston reaches the end of the cylinder.

2. A cylinder block having a cylinder, adjacent valves, a head closing the same, a piston in said cylinder having a stroke such that it closely approaches said head, the valve seats being depressed below the end of the cylinder to form a combustion chamber thereabove and beneath the surface of the cylinder block, there being a restricted passage between the said chamber and the upper end of the cylinder through which the explosive mixture is forced at the end of the piston stroke.

3. A cylinder block constructed with a cylinder and adjacent valve chamber, a piston with a tapered upper surface and of stroke sufficient to leave a minimum clearance on that side removed from the valve chamber, the chamber above the valve communicating with the upper end of the cylinder by a restricted passage through the cylinder wall, and a head to close the cylinder and valve chamber.

4. A cylinder block provided with a cylinder and an adjacent valve chamber, a head covering the said openings, the line of contact with the block being at less than a right angle with the axis of the cylinder, the valve seats being depressed below the said line of contact, the cylinder wall adjacent said valve chamber being cut away to provide a restricted opening, a piston with its upper surface shaped to closely approach the head for the portion of the cylinder opening removed from the valve chamber and to afford a tapered opening leading to the restricted passage in the cylinder wall.

5. A cylinder block comprising a cylinder and adjacent valve chamber, the valve seats being located beneath the plane of the upper surface of the block to provide a combustion chamber, a head covering said cylinder and chamber, the upper end of the cylinder between the chamber and the cylinder being cut away to afford a restricted passage, the piston head being so shaped as to leave a minimum clearance over substantially one-half its upper surface.

6. A cylinder block having a cylinder and adjacent valve chamber opening, the valve seats being depressed to afford a chamber thereabove constituting the major part of the combustion space, a passage in the cylinder wall connecting said chamber and the adjacent portion of the upper end of the cylinder, the piston nearly closing at the end of its stroke the portion of the cylinder remote from the valve chamber, but leaving a tapered space between its upper face and the head communicating with the combustion space by way of the restricted opening.

7. A cylinder block having a cylinder and adjacent valve chamber, a head to close the same, the valve seat being depressed to locate the major part of the combustion chamber thereabove, and within the cylinder block, a passage in the cylinder wall connecting the valve chamber with the adjacent portion of the upper end of the cylinder and a piston having a stroke sufficient to leave a minimum clearance between its upper surface and the head over that part of the cylinder removed from the valve chamber.

8. A cylinder block containing a cylinder and adjacent valves, a head to close the cylinder, a valve chamber, the plane of contact between the block and the head being at less than right angles to the axis of the cylinder; the cylinder walls extending to such plane of contact, the valve seats being below the same, a passage through the cylinder wall to said space above the valve, the piston head being of such shape as to leave a minimum clearance over substantially one-half its upper surface at the end of its stroke.

9. A cylinder block provided with a cylinder and adjacent valves, a head covering same, the line of contact with the head being at right angles to the longitudinal axis of the valve chamber, but at less than right angles to the axis of the cylinder, the valve seat being depressed below said line of contact, the cylinder wall adjacent said valve chamber being cut away to form a restricted opening and a piston with its head shaped to substantially close the upper end of the cylinder throughout the half remote from the valve chamber and to leave a tapered opening into the restricted space communicating with the valve chamber.

10. A cylinder block provided with a cylinder and an adjacent valve chamber, a head covering same, the line of contact with the head being at less than a right angle to the axis of the cylinder the valve seat being depressed below said line of contact, the cylinder wall adjacent said valve chamber being cut away to form a restricted opening and a piston with a wedge shaped head to substantially close a part of the upper end of the cylinder and to leave a tapered opening to the restricted space communicating with the valve chamber.

11. In an engine, a cylinder block having a cylinder and an adjacent valve chamber with a restricted passage therebetween, a removable head for said block, said block and head having engaging surfaces, the plane of said surfaces being at slightly other than a right angle to the axis of said cylinder, a seat for the valve in said valve chamber being depressed below said plane, and a piston movable in said cylinder to a position closely adjacent said plane whereby the combustion chamber is wholly within the cylinder block and for the most part above said valve.

12. In an engine, a cylinder block having a cylinder and an adjacent valve chamber, a piston in said cylinder having a stroke such that it closely approaches the end of said cylinder, the valve chamber having a valve considerably depressed below the upper end of said cylinder, a removable head for said block positioned to lie closely adjacent the piston at the end of its stroke and a restricted passage opening between said cylinder and said valve chamber.

13. An engine having a cylinder block and a removable head, the plane of contact of said block and head forming an acute angle with a plane at the upper end of said cylinder and at right angles to the axis of said cylinder, the block formed with a valve chamber having a valve seat depressed below said plane of contact, a piston in said cylinder having a stroke such that the piston closely approaches the end of said cylinder, the block formed with a restricted opening between the upper end of said cylinder and said valve chamber.

14. The invention set forth in claim 13 said piston having its head shaped to lie parallel with said plane of contact.

In testimony whereof I affix my signature.

DAVID E. ANDERSON.